Nov. 7, 1939.     T. F. TROW     2,179,439
HITCH
Filed Dec. 9, 1938
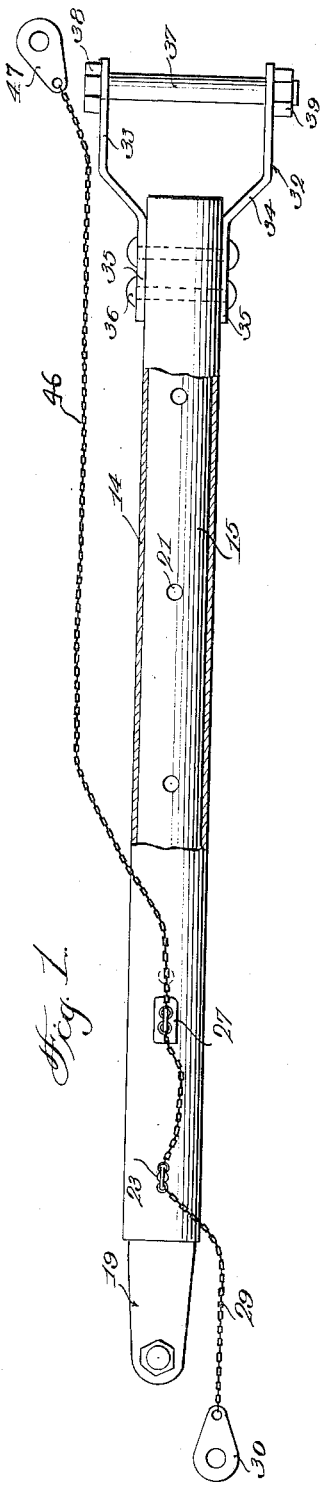
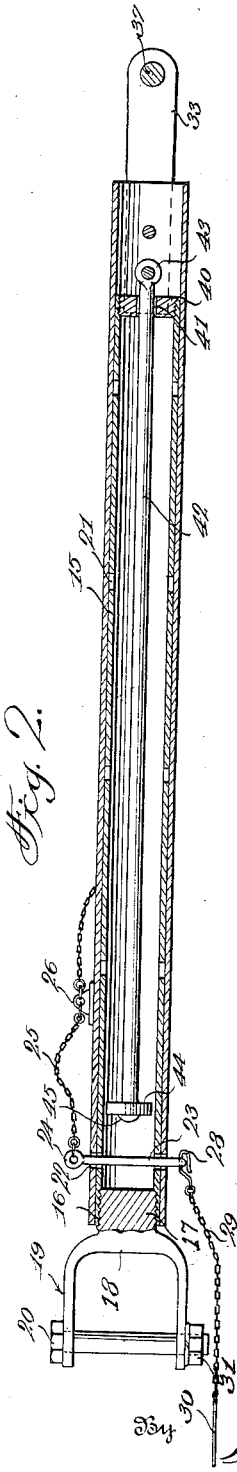
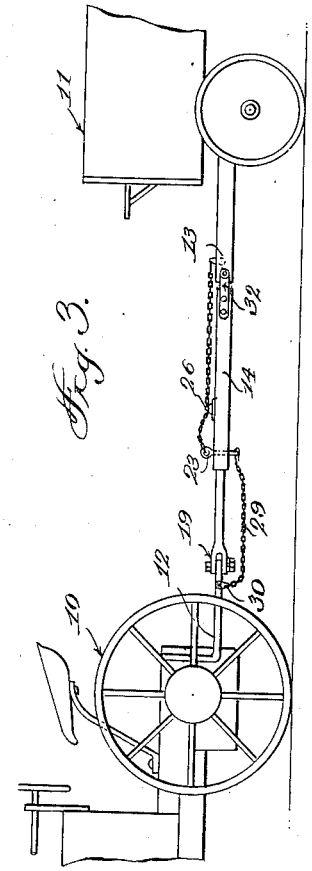
Inventor
Thomas F. Trow
By Kimmel & Crowell
Attorney Patented Nov. 7, 1939

2,179,439

UNITED STATES PATENT OFFICE 2,179,439

HITCH

Thomas Fredrick Trow, Minneapolis, Kans.

Application December 9, 1938, Serial No. 244,835

3 Claims. (Cl. 280—33.14)

This invention relates to trailer hitches or draw bars and more particularly to a device of this character which is of an extensible nature.

An object of this invention is to provide an improved hitch or draw bar which may be connected between a tractor and a trailer body so as to position the trailer body at the desired distance rearwardly of the tractor.

Another object of this invention is to provide a hitch or draw bar of the extensible type which includes a pair of tubular telescoping members and means engaging both of said members to prevent removal of the members one from another while at the same time permitting the members to be extended to the desired length.

A further object of this invention is to provide a hitch of this kind which is exceedingly simple in construction so that it can be manufactured at a relatively small cost, the hitch being formed of tubular material so that it will be relatively light in weight while at the same time having the desired strength.

A further object of this invention is to provide a hitch embodying the use of a safety chain which is secured at one end to the tractor vehicle and at the other end to the trailer so that in the event the hitch becomes loosened from one or the other of the vehicles, the trailer will not break loose from the tractor vehicle. The use of this safety chain is also a factor of safety which is required by law in certain of the States.

A further object of this invention is to provide a hitch structure which is so constructed that the hitch will prevent injury to a person connecting up the trailer with the tractor vehicle so that the tractor vehicle cannot jam against the trailer and thereby crush a person standing therebetween.

A still further object of this invention is to provide a hitch which may be used not only with a tractor vehicle for pulling a trailer, but also may be used as a draw bar or tongue for hitching a team of horses to the trailer.

To the above ends essentially and to others which may hereinafter appear, the invention consists of the novel construction, combination and arrangement of parts as will be more specifically described and illustrated in the accompanying drawing, wherein is shown an embodiment of the invention, but it is to be understood that changes, variations and modifications may be resorted to which fall within the scope of the invention as claimed.

In the drawing:

Figure 1 is a detail top plan partly in longitudinal section of a draw bar or hitch constructed according to an embodiment of this invention, Figure 2 is a longitudinal section of the draw bar or hitch, and Figure 3 is a detail side elevation of the device connected to a tractor and a trailer body.

Referring to the drawing, the numeral 10 designates generally a tractor and numeral 11 designates generally a trailer which is provided with a tongue or draw bar 13. The trailer 10 is provided with a draw bar attaching member 12 which forms part of the trailer 10 and to which the draw bar or hitch hereinafter described is adapted to be connected.

A draw bar or hitch constructed according to this invention includes an outer tubular member 14 and an inner tubular member 15 which is slidable within the outer member 14. The inner member 15 is tubular and at its forward end is provided with interior threads 16 in which a stud 17 carried by the bight 18 of a clevis 19 is adapted to engage. The clevis 19 has a pin 20 extending through the opposite legs thereof which is adapted to engage through the attaching bar 12 so that the opposite legs of the clevis 19 will engage on the upper and lower sides of the plate 12. Where this plate 12 is in vertical position the clevis 19 will be disposed with the pin 20 horizontal instead of vertical. The inner tubular member 15 is provided with a plurality of diametrically opposed and longitudinally spaced apart holes 21 and the outer tubular member 14 is provided adjacent the forward end thereof with a pair of diametrically opposed holes 22. A locking pin 23 having an eye 24 at one end thereof is adapted to engage through the holes 22 and through selected pairs of holes 21 which are in registry with the holes 22. A chain 25 is connected at one end to the eye 24 and at the other end to an upstanding lug or eye 26 carried by a base plate 27 which is fast on the outer tubular member 14 at a point rearwardly of the forward end of this tubular member 14. The pin 23 is provided with an opening through the end opposite from the eye 24 and a clasp or hook 28 carried by a chain 29 is adapted to engage through this hole so as to prevent the pin 23 from sliding out of the holes 22 and the selected holes 21. The opposite end of the chain 29 is connected to a plate 30 which as shown in Figure 3 may be secured in any desired manner to the draw bar 12 of the tractor vehicle.

A second clevis generally designated as 32 is secured to the rear end of the outer member 14 and comprises a pair of parallel arms 33 provided with forwardly and inwardly projecting extensions 34 terminating in parallel forwardly extending portions 35 engaging the bar 14 on diametrically opposed sides thereof. The parallel extensions 35 are secured to the bar 14 by means of headed fastening members 36 which extend diametrically across the interior of the tubular member 14. In the present instance these fastening members 36 are constructed in the form of a pair of rivets or the like. A pin 37 extends across the two parallel arms 33 being provided with a head 38 at one end thereof and a nut 39 is threaded onto the opposite end as to detachably secure the clevis 32 on the forward end of the draw bar 13.

An elongated chain 46 having a plate 47 connected to one end thereof is connected to the opposite end to the eye 26 and the plate 47 as shown in Figure 3 is adapted to be secured to the draw bar or other suitable portion of the trailer so as to provide a factor of safety in the event the bolts 20 or 37 become loosened. The draw bar herein disclosed is of such a length that if desired, the tubular member 15 may be pulled out of the tubular member 14 in order to extend the tubular member 15 for a distance sufficient to permit the hitching of a pair of horses one on each side of the extended hitch structure. Where this is done the clevis 19 is used to hold a whiffletree and the horse may be positioned one on each side of the hitch structure.

In the use of this draw bar or hitch, the two draw bar members 14 and 15 are adjusted relative to each other as to length by withdrawing the locking pin 23 and inserting this pin 23 in a selected opening 21 of the inner bar member 15. The clasp or hook member 28 is then inserted through the end of the pin 23 so that the pin 23 cannot slide out of the openings 21 and 22. The forward clevis 19 is adapted to be mounted on the attaching plate 12 and the rear clevis 32 is adapted to be secured to the forward end of the draw bar 13. The axis of the pin 20 is at right angles to the axis of the pin 37 so that the trailer 11 may rock vertically on the pin 37 and the tractor 10 may swing relative to the trailer 11 and the draw bar structure on the vertical pin 20.

What I claim is:

1. A hitch comprising an inner and an outer tubular member slidable one relative to the other and the inner member having longitudinally spaced apart holes diametrically therethrough, said outer member having a pair of diametrically opposed holes adjacent an end thereof, a pin engageable with said outer member and through selected holes in said inner member to hold said members against movement relative to each other, a clevis carried by the outer end of each member, a plug carried by the inner end of said inner member provided with an axial opening, a rod slidable through said plug opening, means securing the outer end of said rod within said outer member adjacent the outer end thereof, and a plate carried by the inner end of said rod slidable in said inner member and engageable with said plug to hold said members against separation.

2. A hitch comprising an inner and an outer tubular member slidable one relative to the other, said inner member having a plurality of longitudinally spaced apart holes therethrough, said outer member having a pair of diametrically opposed holes therethrough, a locking pin engageable through said holes of said outer member and selected holes of said inner member to lock said members in longitudinally adjusted position, a pair of parallel arms at the rear end of said outer member, means engaging through said outer member securing said arms on said outer member, a clevis at the forward end of said inner member, a stud carried by the bight of said clevis threadedly engaging in said inner member, a rod disposed in said inner member and projecting rearwardly of the rear end thereof, an eye carried by the rear end of said rod engaging a securing means for said parallel arms, a plug fixed in the rear end of said inner member having an axial aperture to slidably receive said rod, and a plate fixed on the forward end of said rod within said inner member adapted to hold said members against separation.

3. A hitch comprising an inner and an outer tubular member slidable one relative to the other, said inner member having a plurality of longitudinally spaced apart holes therethrough, said outer member having a pair of diametrically opposed holes therethrough, a locking pin engageable through said holes of said outer member and selected holes of said inner member to lock said members in longitudinally adjusted position, a chain secured to said outer member and one end of said pin, a pair of parallel arms at the rear end of said outer member, means engaging through said outer member securing said arms on said outer member, a clevis at the forward end of said inner member, a second chain secured to said clevis, and a releasable securing means carried by said second chain engageable with the opposite end of said pin, a stud carried by the bight of said clevis threadedly engaging in said inner member, a rod disposed in said inner member and projecting rearwardly of the rear end thereof, an eye carried by the rear end of said rod engaging a securing means for said parallel arms, a plug fixed in the rear end of said inner member having an axial aperture to slidably receive said rod, and a plate fixed on the forward end of said rod within said inner member adapted to hold said members against separation.

THOMAS FREDRICK TROW.